United States Patent [19]

Kolb et al.

[11] Patent Number: 5,524,078
[45] Date of Patent: Jun. 4, 1996

[54] METHOD FOR MONITORING VEHICLE FUNCTION COMPONENTS

[75] Inventors: Hartmut Kolb, Ludwigsburg; Wolfgang Woletz, Esslingem; Hans Schroeter, Stuttgart, all of Germany

[73] Assignee: Mercedes-Benz AG, Stuttgart, Germany

[21] Appl. No.: 368,806

[22] Filed: Jan. 5, 1995

[30] Foreign Application Priority Data

Jan. 5, 1994 [DE] Germany ........................ 44 00 203.3

[51] Int. Cl.⁶ .................................................. G06F 17/40
[52] U.S. Cl. .............................. 364/424.03; 364/551.01; 364/579; 364/281.3
[58] Field of Search ............................ 364/424.03, 579, 364/194, 281.3, 550, 551.01; 395/912, 913, 914, 915, 916, 917, 918, 919, 922, 575, 650, 183, 184, 185; 371/15.1

[56] References Cited

U.S. PATENT DOCUMENTS

| | | | |
|---|---|---|---|
| 4,212,060 | 7/1980 | Prey | 364/281.3 |
| 4,251,885 | 2/1981 | Dodt et al. | 364/281.3 |
| 4,322,846 | 3/1982 | Carroll et al. | 364/281.3 |
| 4,404,639 | 9/1983 | McGuire et al. | 364/579 |
| 4,637,020 | 1/1987 | Schinabeck | 364/579 |
| 4,656,586 | 4/1987 | Ochiai et al. | 364/579 |
| 4,809,170 | 2/1989 | Leblang et al. | 364/281.3 |
| 4,926,363 | 5/1990 | Nix | 364/579 |
| 4,928,278 | 5/1990 | Otsuji et al. | 364/571.01 |
| 4,954,948 | 9/1990 | Hira et al. | 364/200 |
| 5,126,953 | 6/1992 | Berger et al. | 364/579 |
| 5,297,047 | 3/1994 | Matsuno | 364/551.01 |
| 5,319,580 | 6/1994 | Sakata et al. | 364/579 |
| 5,349,656 | 9/1994 | Kaneko et al. | 395/650 |
| 5,351,247 | 9/1994 | Dow et al. | 395/916 |
| 5,398,197 | 3/1995 | Ogata et al. | 364/580 |
| 5,430,736 | 7/1995 | Takeoka et al. | 364/579 |
| 5,448,722 | 9/1995 | Lynne et al. | 395/916 |
| 5,463,637 | 10/1995 | Hayashi | 364/579 |

FOREIGN PATENT DOCUMENTS

| | | |
|---|---|---|
| 0015445 | 9/1980 | European Pat. Off. . |
| 3229411 | 3/1983 | Germany . |
| 3221398 | 12/1983 | Germany . |
| 3540599 | 5/1987 | Germany . |
| 3726344 | 2/1989 | Germany . |
| 3904915 | 9/1989 | Germany . |
| 3932436 | 3/1990 | Germany . |

Primary Examiner—Kevin J. Teska
Assistant Examiner—Tyrone V. Walker
Attorney, Agent, or Firm—Evenson, McKeown, Edwards & Lenahan

[57] ABSTRACT

A method is provided for monitoring vehicle function components using a diagnostic device taken along in the vehicle. A multiplicity of individual test routines are carried out, respectively, given the presence of start conditions specific to the test routine, in a fixed, cyclic sequence in order to obtain information on the presence or absence of a fault with respect to the relevant function components. Data relating to a first-time execution of a respective test routine is retrievably stored. With the aid of this data, before activation of a test routine pending according to a sequence provided it is determined given the presence of appropriate start conditions whether the test routine has already been performed at least once and whether at least one other activatable test routine exists which has not yet been performed. If no, the pending test routine is activated, otherwise, the test routine not yet performed is activated. This flexibility guarantees the presence of test results for each test routine in an operating time which is as short as possible.

7 Claims, 3 Drawing Sheets

METHOD FOR MONITORING VEHICLE FUNCTION COMPONENTS

BACKGROUND AND SUMMARY OF THE INVENTION

The invention relates to a method for continuously monitoring vehicle function components through the use of a diagnostic device taken along in the vehicle and, in particular, to monitoring function components relevant to exhaust gases, using a multiplicity of single test routines which are successively pending in a prescribed cyclic sequence. Each test routine is respectively activated only in the presence of interrogatable start conditions specific to the test routine. Such a diagnostic method is used, for example, for continuously monitoring vehicle function components, relevant to exhaust gases, in the running operation of the vehicle.

Ever more complex electronic control components have been used recently in motor vehicles, for example for fuel injection, for ABS and ASR systems, for automatic transmissions, and the like. This has produced the need to be able to test such vehicle function components quickly and cost-effectively and, as the case may be, to repair them. The known workshop manner conventionally used for testing and repair have quickly proved to be unsatisfactory for this purpose. One reason for this is that although important information on the sequence of the functions, for example, manipulated variables, filed in a control device are present in the computer of the control device, they cannot be rendered accessible using the conventional workshop techniques. This made it necessary to develop diagnostic systems and diagnostic methods which are adapted to modern vehicle electronic systems.

Customary known diagnostic systems can be subdivided into external, so-called off-board diagnostic systems and vehicle-mounted, so-called on-board diagnostic systems. In the off-board diagnostic systems an external diagnostic device is connected, for example on the workshop side, to the vehicle electronics. The diagnostic method is stored in the external diagnostic device. After the connection, the stored diagnostic method is carried out with the motor running. Such diagnostic systems are disclosed, for example, in German Patent documents DE 39 04 915 C2 and DE 39 32 436 C2.

In the case of an off-board diagnostic system specified in the German Patent document DE 32 29 411 A1, an external test unit signals to a control device, located inside the vehicle electronics and capable of being connected to said test device, via a test connection that a fault monitoring procedure filed there as a program in a memory is to be carried out a central processing unit of the vehicle electronics. Thereafter, a series of test points which are identified with the aid of the input signals are tested. The test program, that is to say the diagnostic method, is always carried out when the central processing unit is not occupied with vehicle electronics control programs, such as engine control programs. After each execution of the test program, the respective test result is retrievably stored in a nonvolatile memory. All the test routines are carried out in a prescribed, fixed sequence, as filed in the relevant memory.

By contrast, on-board diagnosis has recently been preferred, since it very effectively permits vehicle function components to be continuously monitored on board in the vehicle during driving operation. It is precisely this type of monitoring which is even partially prescribed by statute, for example in the State of California in the United States for relevant exhaust gas systems and components in passenger cars.

In a diagnostic system for a motor vehicle, disclosed in German Patent document DE 35 40 599 A1, off-board or on-board diagnosis is possible in an optionally switchable fashion. A switching capability, which can be operated by the user, is proposed for the on-board diagnostic method, in order to activate an automatic, sequentially proceeding diagnostic sequence of test routines which are prescribed in a fixed fashion. Faults which have respectively occurred are displayed for some time or are reproduced on an external logging unit. The known diagnostic system is intended to permanently detect general and/or safety-relevant system defects in the control systems or function systems and/or other vehicle components during driving as well, and to display them to the driver while driving. In order to carry out the diagnostic method, a test unit which contains, in particular, a microcomputer and further customary peripheral components, is arranged inside the vehicle electronics. In particular, memories are present in which, inter alia, the fixed sequence of the test routines to be carried out is stored.

German Patent document DE 37 26 344 C2 discloses a diagnostic system for control devices of a motor vehicle, in which there are stored in a respective control device diagnostic routines. The diagnostic routines can be activated for vehicle components driven by this control device. In this case, a priority sequence is prescribed in each case both for the selection of the respective control device by a diagnostic computer integrated in the vehicle or an external diagnostic device for diagnostic purposes, and for carrying out the diagnostic routines inside a control device. Using different diagnostic control pulses, it is possible in accordance with this priority sequence both to progress inside a control device from one diagnostic routine to the next and to progress from one control device to the next. It is further possible to skip diagnostic routines that are not to be executed. The faults detected in each case by a control device are reported and displayed by the control device and are stored by it in a fault memory of the diagnostic computer or of the diagnostic device.

German Patent document DE 32 31 398 A1 describes a data acquisition system for vehicles which contains a device, installed in the vehicle, for cyclic acquisition of the data from transmitters which detect the dynamic vehicle variables of specific vehicle states. The data acquisition system further includes a cassette for data storage which can be inserted into the device, and a computer for receiving and processing the data stored in the cassette. In order for the vehicle owner to flexibly determine which of the data acquired by the transmitters are respectively to be evaluated, the computer provides the data memory of the cassette with selection information which can be prescribed by the vehicle owner. With the aid of this selection information, the data acquisition process is then carried out according to a prescribed data acquisition routine which contains, inter alia, an interrogation of the individual transmitter data in a predetermined sequence.

In present on-board diagnostic systems, the checking of sensors, actuators and further function components as a function of the desired test thoroughness requires a set of individual test routines. The number of test routines is frequently greater than 50 in the case of modern systems. However, given such a large number of test routines, of which frequently a plurality can be carried out under the same start conditions but not simultaneously, it is not very effective to process these test routines in accordance with a sequence which is prescribed in a fixed fashion.

There is therefore needed a method for continuous, on-board monitoring of vehicle function components using a diagnostic device which is taken along in the vehicle. By use of the diagnostic device, the method must perform a multiplicity of test routines effectively and must permit as quickly and reliably as possible the determination of a statement as to whether all the monitored function components are operating properly.

These needs are met according to the present invention by a method for continuously monitoring vehicle function components using a diagnostic device taken along in the vehicle, in particular to monitoring function components relevant to exhaust gases, using a multiplicity of single test routines which are successively pending in a prescribed cyclic sequence. Each test routine is respectively activated only in the presence of interrogatable start conditions specific to the test routine. An item of data information relating to whether a respective test routine has been carried out at least once in the current operating phase is retrievably stored in a memory. Before activation of a test routine pending according to the prescribed sequence, by retrieving the appropriate stored data it is detected whether this test routine has already been carried out at least once before and whether at least one other test routine exists whose start conditions are present and which has so far not yet been carried out, whereafter the pending test routine is activated when this is not the case. The at least one other test routine so far not yet carried out is activated when this is the case.

The processing of the test routine sequence is thereby flexibly configured, since it is possible to deviate from the prescribed sequence when it is established upon appropriate interrogation of memory contents, that a pending test routine has already been carried out once and, by contrast, another test routine whose start conditions are present has so far not yet been carried out. The memory contents are provided in memories arranged in the vehicle. Instead of once again carrying out the pending routine, in this case a jump is made in the test routine sequence to the test routine that has not yet been carried out, and the latter is carried out for the first time. This procedure guarantees that in the case of a multiplicity of test routines, each test routine is carried out at least once after a comparatively short time, after which detailed information is then present regarding the presence or absence of system faults with respect to all the monitored function components.

A further embodiment of the invention permits so-called secondary fault exclusion, that is to say, blocking an evaluation of the respectively activated test routine and of test routines dependent on the result thereof makes it possible to trace faults in the presence of implausible values of input variables, and only causal faults are recorded. This has the result that fault localization is not complicated by an abundance of secondary faults.

In accordance with a still further embodiment of the invention, it is preferred for the presence of a fault not to be signalled until the ratio of test results of a test routine which are indicative of a fault to those which are not indicative of a fault and were acquired over a prescribed period exceeds a prescribable limiting value. As a result, so-called fault debouncing is realized, that is to say, not every implausible state or measured value detected by carrying out a test routine is immediately declared as a fault, but it is not concluded that there is a fault until there is sufficiently frequent confirmation of such implausible states or measured values.

Another advantageous embodiment of the invention permits the generation of a readiness identifier, in which a retrievable item of information indicating that each test routine has already been carried out at least once. Thus, for example, it is possible to indicate to the user whether test results have already been generated for all monitored function components in the current operating phase, and therefore whether reading out an available fault memory at the respective instant is sensible or not.

A further advantageous embodiment of the invention is in particular, in conjunction with an additional connectable off-board diagnostic system, since such monitoring is greatly eased by the presence of environmental data, for example, data relating to vehicle speed, motor speed, load, coolant temperature, route, duration of the current operating phase and operating states of the control loop which characterize the system state in the case of the first and of the respectively last occurrence of the fault or of an implausible state or measured value. At the same time, there is not an excessive demand on storage space because of the restriction to storage of the data in the case of the first and in the case of the respectively last occurrence of a fault.

As a result of a further embodiment of the invention, a warning lamp provided for the driver is activated by the vehicle diagnostic system, which is carried out automatically, only when a respective fault is present in different situations with sufficient probability.

Other objects, advantages and novel features of the present invention will become apparent from the following detailed description of the invention when considered in conjunction with the accompanying drawings.

DETAILED DESCRIPTION OF THE DRAWINGS

Figure 1:
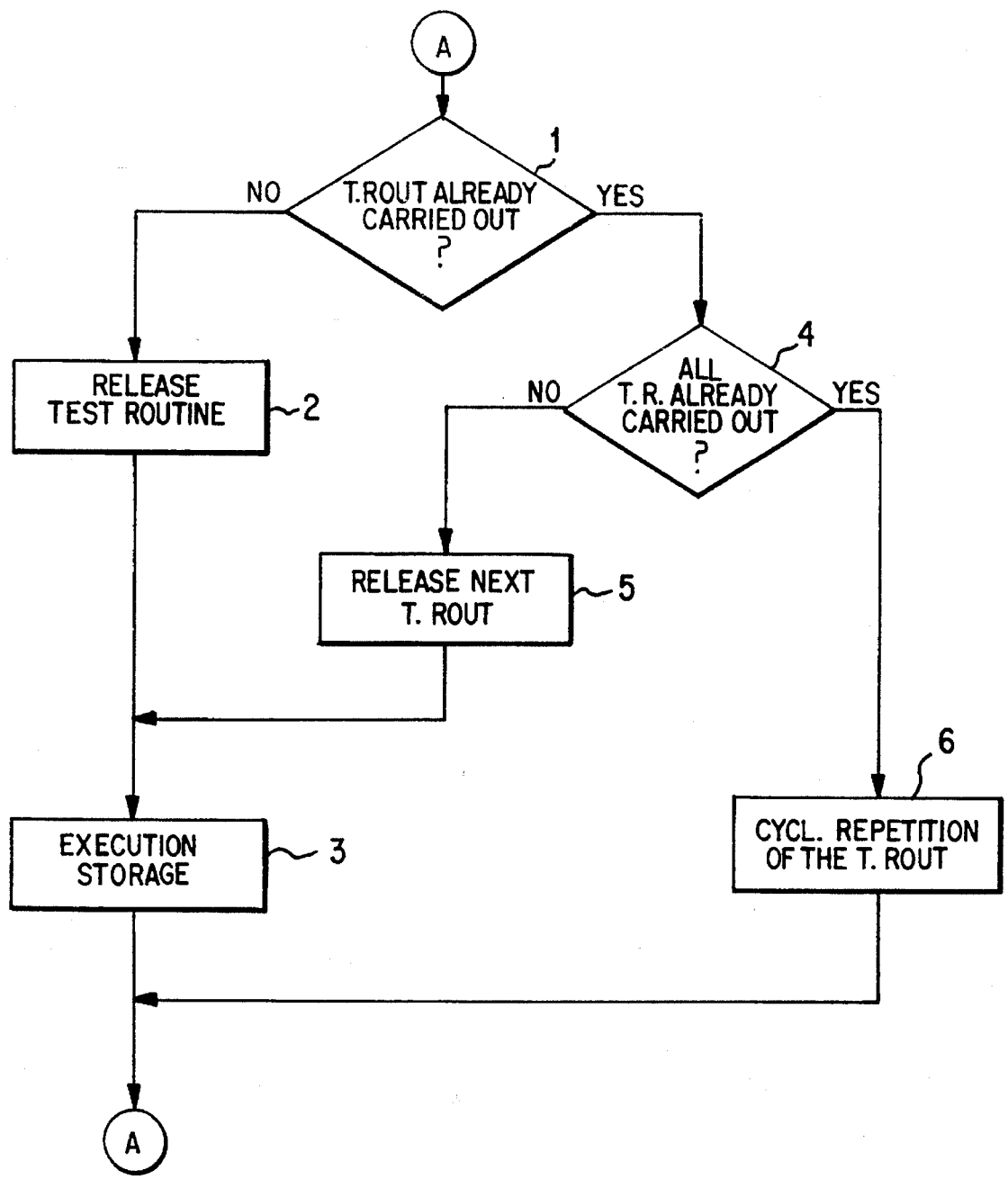
FIG. 1 shows a flow diagram of a section of a method for monitoring vehicle function components, which relates to the acquisition of test routines carried out and the determination of a test routine respectively to be next carried out.

The method described, of which important sections of the method are represented in the drawings and described below, serves the purpose of on-board diagnosis, that is to say, the continuous, on-board monitoring of function components of a motor vehicle using a diagnostic device taken along in the vehicle. The method sequence is filed in this case in a corresponding memory of the diagnostic device, which diagnostic device essentially has a conventional design, for example, of the type of one of the known diagnostic systems mentioned at the beginning. From the description of the method, it will be clear to the person skilled in the art how he may have to modify individual modules of a known diagnostic device in order to carry out this diagnostic method.

The flexible handling according to the method in the sequence of processing the test routines is explained, together with the recording of the latter, with the aid of FIG. 1. It goes without saying that before a first diagnosis, the test routine sequence has first been stored, together with the total diagnostic method sequence, in the on-board diagnostic device. After which, the diagnostic method is respectively activated when driving starts. These steps are performed in a way which is customary for on-board diagnoses and is of no further interest here. The instantaneously present states or measured values of the monitored function components are then initially acquired and compared with the start conditions for the test routine instantaneously pending in accordance with the sequence. These start conditions are stored in the diagnostic device in a fashion specific to the test routine, in order to permit activation of the respective test routine only under conditions during the drive which fit them. In this case, the cyclic sequence of the test routines is continued until the comparison shows that the start conditions are now present for a specific test routine.

This method stage corresponds to the starting point (A) of the method section shown in FIG. 1. An initial inquiry is made in the section in a first step 1 as to whether the pending test routine has already been carried out at least once during the current driving or diagnostic operation. If not, this test routine is released for processing and carried out (step 2), whereupon in the next step 3 an item of information relating to carrying out this test routine is filed as retrievable data in a memory provided for this purpose. Thereupon, the method returns to the starting point (A). The method section starts anew by comparing the instantaneous states or measured values of the monitored function components of the vehicle with the start conditions of the next pending test routine.

If it is established in the first step 1 that the pending test routine has already been carried out at least once, it is then established in a next step 4 whether all the test routines which have the appropriate start conditions have already been carried out in the present operating phase. For this purpose, the test routines with the appropriate start conditions are successively interrogated in accordance with the prescribed sequence. If a test routine which has not yet been processed is detected thereby, the next step is to release and carry out this detected test routine (step 5), after which the process proceeds to method step 3, in order to now store an item of information on carrying out this test routine and subsequently to return again to the starting point (A). If, by contrast, after cyclic interrogation of the test routines, the method finally returns in step 4 to the original test routine without finding a test routine with appropriate start conditions which has not yet been carried out, meaning that all the test routines with appropriate start conditions have already been processed at least once, a cyclic repetition of the test routines already carried out at least once is performed in the next step 6. The cyclic repetition starts with the initially pending test routine. It is the case that, after respective processing of a test routine, a return is made again to the starting point (A) and thereby an inquiry is made as to whether the start conditions for the next test routine are still present before the latter is activated.

Since the activation of each individual test routine requires specific enter criteria to be fulfilled, i.e., start conditions, and since it is frequently the case that the start conditions for a plurality of test routines which cannot run simultaneously are simultaneously fulfilled, in such situations the mode of procedure described above permits, if possible, all test routines to be carried out in the course of one operating phase, i.e., during one driving operation. For this purpose, the method is capable of deviating from the prescribed cyclic test routine sequence and jumping to such test routines which have not yet been processed in the present operating phase. Establishing this is made possible by storing for each test routine a retrievable item of information relating to its first execution within an operating phase. By retrieving this item of information from the memory, the diagnostic device can establish whether the pending test routine has already been carried out or not. Only when all the test routines for which the respectively instantaneously detected states or measured values of the monitored vehicle function components correspond to the required start conditions have been carried out once in the course of an operating phase, does the renewed, cyclic repetition of the execution of these test routines start. The result of this operation is that complete diagnostic information relating to all the function components to be monitored is present after an operating time that is as short as possible. The storage of retrievable information data relating to the execution of a test routine performed completely at least once since the start furthermore renders it possible for the diagnostic system to establish whether an item of information present in an appropriate memory and relating to the absence of a specific fault actually originates from an associated execution of a test routine in this operating phase, or instead, for example, from a preset memory.

Figure 2:
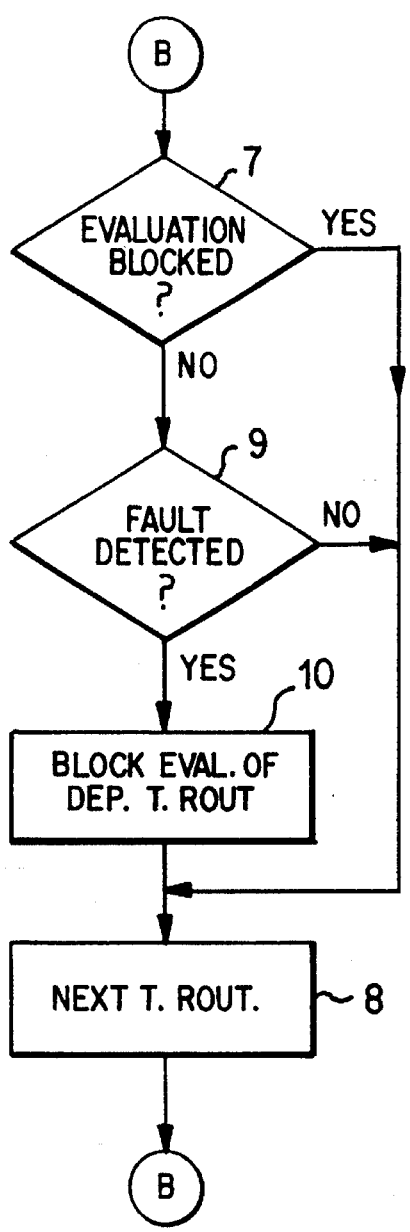
FIG. 2 shows a flow diagram of a further section of the diagnostic method, which relates to blocking certain test routines in the event of a detected fault.

FIG. 2 will now be used to describe a section of the method in which the undesired detection of secondary faults is avoided. It should be mentioned for this purpose that the evaluation of a test routine respectively requires specific input information, that is to say the instantaneous values of specific input variables, which can consist, for example, of output values of other test routines and/or sensor measured values. If, now, such an earlier test routine has already delivered a fault result, its output variables possibly have implausible values, and this acts correspondingly on those test routines for which these output variables serve as input variables. The result is that carrying them out could lead to fault results, so-called secondary faults, which would have to be ascribed not to a fault function of the corresponding vehicle function component, but merely to incorrect input variables. However, it is undesirable to detect these faults, the aim of monitoring being, rather, to detect precisely those faults which are causally ascribed to malfunctions in the monitored vehicle function components.

The diagnostic method according to the invention provides the following mode of procedure to prevent such secondary faults in accordance with FIG. 2. For each test routine, a list is stored of the test routines influenced by it in the manner explained above. Moreover, a memory location is provided for storing an item of information as to whether the evaluation is permitted or blocked for the respective test routine. Proceeding from the starting point (B), an inquiry is first made in the case of a pending test routine (step 7) as to whether an identification character "evaluation blocked" is set in the memory, as is the case when a higher-level test routine has led to implausible output variables. If this is the case, the evaluation of the present test routine is skipped and the method continues by way of the next test routine (step 8), after which there is then once again a return to the starting point (B), whereupon the test routine is again interrogated with regard to blocked or released evaluation. If, by contrast, it has been detected in the interrogation step 7 that the test routine evaluation is not blocked, the method continues by way of an interrogation step 9 in which it is detected whether the test routine carried out has led to the detection of a fault result. If not, no further measures are required, and the method jumps to step 8 to continue with the next step routine. If, by contrast, a fault result was detected by the test routine, in a subsequent step 10 the relevant identification characters for all the test routines dependent on the instantaneously present test routine are set to "evaluation blocked", that is a retrievable item of information is stored to the effect that evaluation of these dependent test routines is left undone before then going over in step 8 to the next test routine. This information with respect to blocked or non-blocked evaluation is then later retrieved at the appropriate time for the respectively pending test routine in order to answer the input interrogation (step 7) with respect to a blocked or released evaluation.

The result of this is that the respective input information for a test routine is tested, and test routine evaluation is suppressed when one or more of its items of input information appear to be implausible. At the same time, this process is marked by blocking the evaluation of test routines dependent thereon, with the result that it is possible to trace faults without any problem. Consequently, it is only the fault information causing the malfunctions of the monitored vehicle function components which is recorded, with the result that the fault localization is not complicated by an abundance of detected secondary faults.

Figure 3:
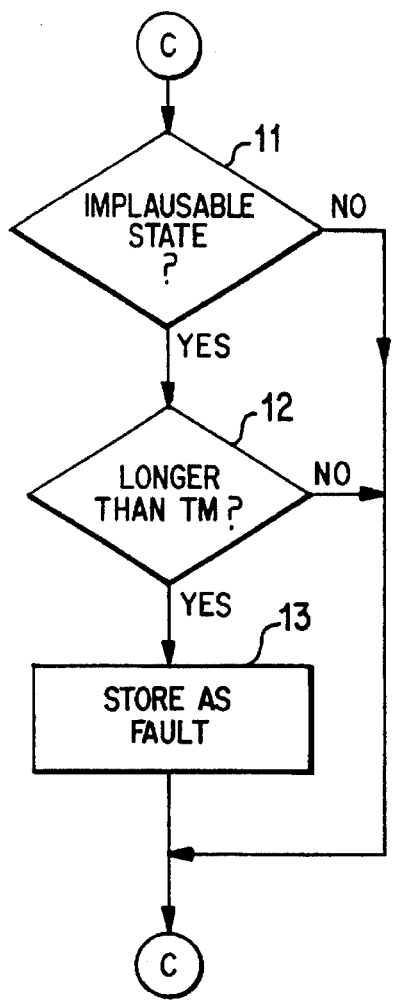
FIG. 3 shows a flow diagram of a further section of the diagnostic method, which relates to carrying out a so-called fault debouncing.

Illustrated in FIG. 3 is a method section which serves the purpose of so-called "fault debouncing". This means that a first-time test result which appears implausible is first evaluated only as a fault symptom and not immediately as a fault. Rather, it is desirable that such implausible states or measured values detected by the test routines are first still to satisfy further criteria before they are declared as faults. Whether a state or measured value is implausible is established in this case by comparing the detected state or measured value with prescribed, stored value ranges for this respective state or measured value and deducing implausibility if the present value lies outside the associated value range.

For the fault debouncing according to FIG. 3, a so-called debouncing time ($T_m$) is fixed during which monitoring is carried out as to whether the respective fault symptom, that is, the implausible state or measured value, is uninterruptedly present. Specifically, proceeding from the starting point (C), an inquiry is first made as to whether the test routine has produced an implausible state or measured value (step 11). If this is not the case, an iterative return is made to the starting point (C). If, by contrast, an implausible state or measured value has been produced, a time counter is used to detect whether this implausible state or measured value has already lasted longer than the fixed debouncing time ($T_m$) (step 12). If not, the time counter is reset and the method is repeated iteratively from the starting point (C). If, by contrast, the implausibility has already been present longer than the set debouncing time ($T_m$), this is now detected as a fault and stored (step 13), before a return is made again to the starting point (C). The above method of fault debouncing by fixing a specific debouncing time is particularly suitable for monitoring input signals. In the case of monitoring functional chains, a favorable alternative procedure consists in providing a fixed number of repetitions for a test operation and not concluding that a fault is present until after two or more successive test operations provide a negative result.

Figure 4:
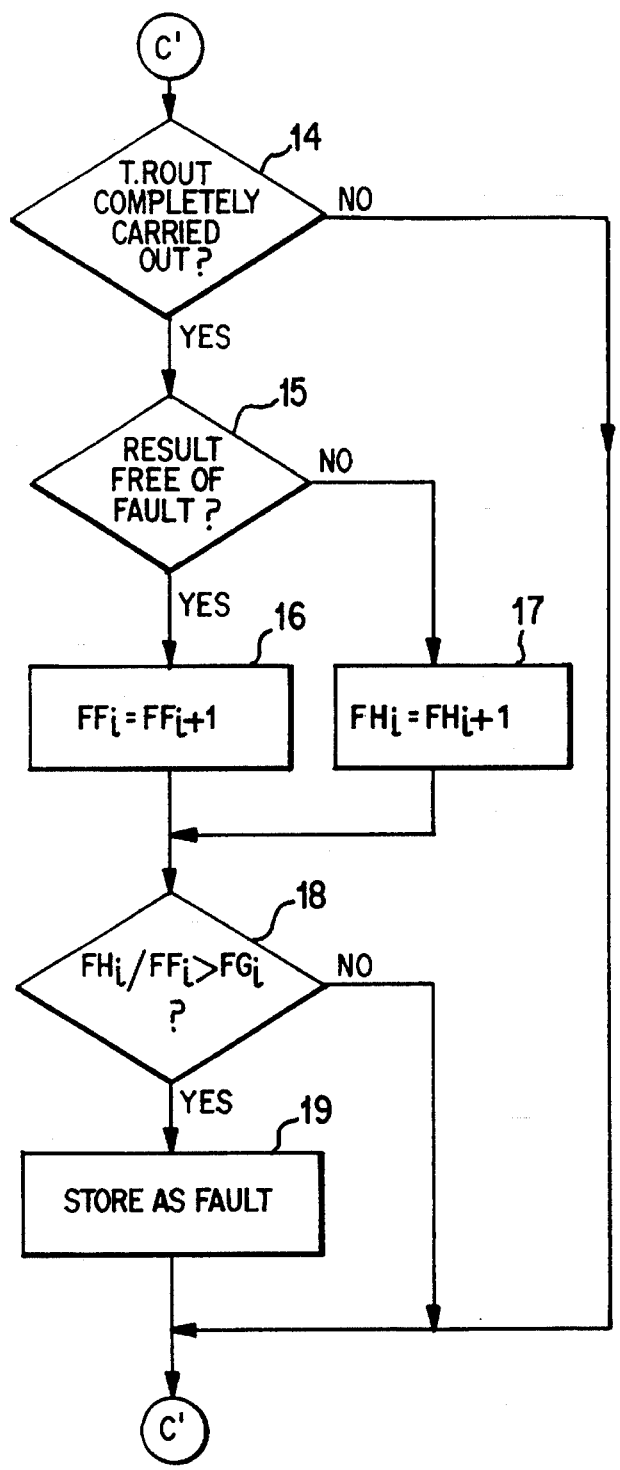
FIG. 4 shows a flow diagram of a method section, which can be provided as an alternative to that in FIG. 3, for fault debouncing.

A further mode of procedure, alternative to the one above, for fault debouncing is illustrated in FIG. 4. In this method, an inquiry is initially made, proceeding from a starting point (C'), as to whether a respective test routine has been completely carried out (step 14). If not, an iterative return is made to the starting point (C'). Fault detection then is unnecessary. If, by contrast, the test routine has been completely carried out, the next move is to inquire (step 15) whether a fault-free result has been produced or not. If yes, a "fault-free counter ($FF_i$) provided for the respective ith test routine and initially set to zero, is increased by one (step 16). Otherwise, a "faulty" counter ($FH_i$) provided in the same manner for the respective ith test routine and initially set to zero is increased by one (step 17). In both cases, this is followed by an interrogation step 18 in which it is established whether the quotient of the instantaneous count value of the "faulty" counter ($FH_i$) and that of the "fault-free" counter ($FF_i$) has exceeded a stored limiting value ($FG_i$) prescribed for the respective ith test routine. If this is not the case, the previous test results as a whole are not interpreted as faults, and a return is made to the starting point (C'). By contrast, as soon as it has been detected in step 18 that the limiting value has been exceeded, the previous test results as a whole are interpreted as the presence of a fault and this is retrievably stored as corresponding information (step 19) before a return is made once again to the starting point (C').

It follows that an error is not deduced with this method until the ratio of test results indicative of a fault, that is, results with implausible states or measured values, to the test results not indicative of a fault, that is, results with plausible detected states or measured values, exceeds a prescribed dimension. In a manner not shown in greater detail, a debouncing time during which the test results produced are split into those not indicative of a fault and those indicative of a fault and summed up is in turn thereby prescribed in a fixed fashion. It is advantageous in this case when monitoring functional chains to extend the debouncing time to the entire duration of an operating phase, that is, that fault detection does not take place until the vehicle is parked.

Furthermore, the retrievable information that all the test routines have already been carried out at least once is utilized to provide a so-called readiness identifier, that is, a display is made available as to whether all the test routines have already taken place once. Consequently, it can be determined if it is already expedient or not at the present instant to read out from the fault memory in which the detected faults are retrievably stored. This can be established by retrieving the data by carrying out the test routine, which is done at least once. The knowledge of whether it is already presently sensible to read out from the fault memory is useful, in particular, for handling diagnostic systems "in the field".

An on-board diagnosis is not always capable of determining the exact fault location, and must therefore in many cases be limited to the supposedly faulty part. For this purpose, the diagnostic method provides the possibility of a following off-board diagnosis during which part of the monitoring is performed. It is favorable for this purpose, if there is available a set of environmental data, for example, the most important operating data such as vehicle speed, motor speed, load, coolant temperature, route and duration of operation since the start, as well as the operating states of the control loops, which represent the system state on the occurrence of a fault or of a fault symptom. The on-board diagnostic method performs this by using a method section (not represented explicitly) by virtue of the fact that for each fault or each fault symptom a first set of environmental data is stored upon its first occurrence and a second set of corresponding environmental data is additionally stored for its respective last occurrence. The data can then be retrieved and used in the case of a subsequent off-board diagnosis.

The mode of procedure for undertaking, for each fault which has occurred, two memory entries with regard to its occurrence and, as the case may be, the present environmental data, specifically one for its first and one for its respective last occurrence, signifies an advantageous compromise by which, on the one hand, as much information as possible is provided and, on the other hand, excessive costly storage space is avoided. Upon the first occurrence of a fault, the two memory entries are identical in this case. In addition to the data relating to the occurrence of the fault, it is advantageous that each instance of storage for the purpose of preserving information on this fault and its attendant circumstances includes a complete data record consisting of an assigned fault number, the associated environmental data record, and information on the frequency of the occurrence of this fault.

Figure 5:
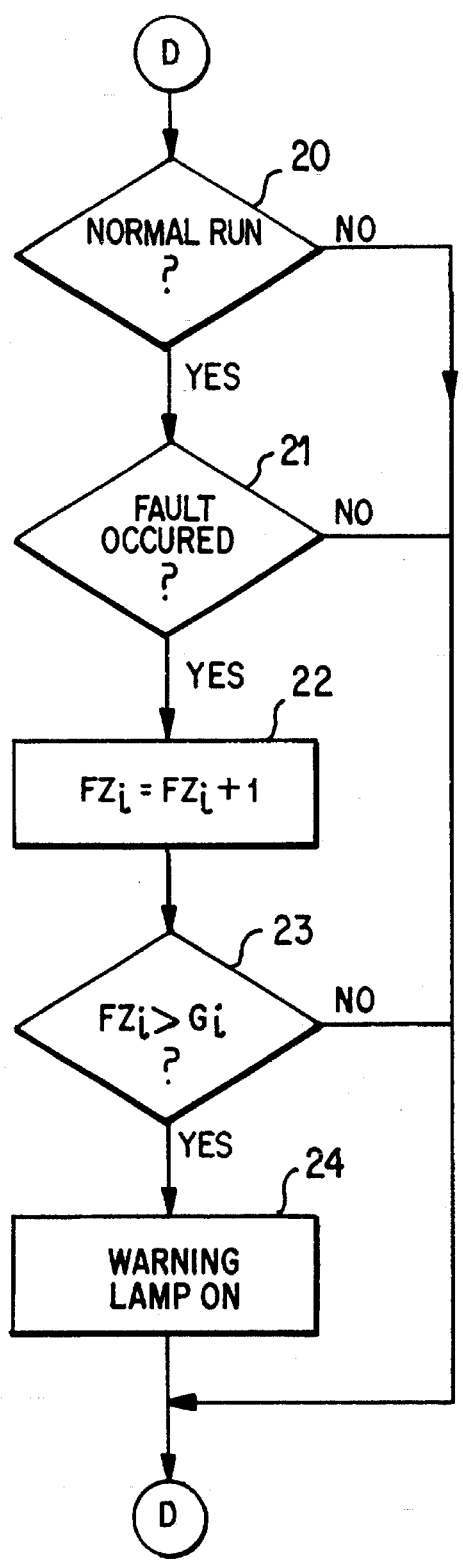
FIG. 5 shows a flow diagram of a further section of the diagnostic method, which relates to activating a warning lamp.

For the purpose of driver information, in the diagnostic system which carries out the method, a warning lamp is provided which is driven by the method, with the assistance of an independent memory location. This has the aim of switching on the warning or fault lamp only when the presence of a fault in different situations is sufficiently corroborated. The associated method step is reproduced in FIG. 5. Proceeding from a starting point (D), it is first checked whether a so-called normal run is present (step 20). A normal run is present in this case by definition when all the test routines which are to run under the normal vehicle operating conditions have been carried out during an operating phase. In the absence of a normal run, an iterative return is made to the starting point (D). Only if a normal run is present is an inquiry made (step 21) as to whether a fault has occurred during such a normal run. If not, an iterative return is again made to the starting point (D). If yes, this fault detection is fed to a frequency evaluation section. Special provision is made for this purpose of a fault counter ($FZ_i$) which is initially set to zero for this ith fault and is then increased in each case by one for each normal run in step 22 when a fault occurs. Subsequently, the new count value ($FZ_i$) is checked thereupon (step 23) as to whether it is larger than a prescribed, stored limiting value ($G_i$). If not, activation of the warning lamp is abandoned and an iterative return is made to the starting point (D). Only if it is detected in step 23 that the limiting value has been exceeded is the warning lamp turned on in the subsequent step 24. An alternative possibility for frequency evaluation resides in undertaking activation of the warning lamp when the same error has occurred in two successive normal runs. Alternatively, frequency evaluation is, furthermore, possible in such a way that the quotient of the frequency of fault detection in normal runs and the total number of normal runs is determined and the warning lamp is requested to be turned on when this quotient exceeds a prescribed limiting value.

Known diagnostic systems are usually designed to search for system faults, and it is characteristic of this that independently of whether the system has already been tested or not, "fault-free" information is provided as long as no fault has yet been detected. Furthermore, the boundaries between the fault-free state and the faulty state are traditionally placed at the fault end of a possibly uncertain detection range. This leaves undone many indications which announce failures or deteriorating conditions emerging at an early stage. This is countered by the present diagnostic method owing to the fact that here testing is done both for faults and for confirmation of all the vehicle function components to be monitored. The decision criteria for assessing the presence of a fault or a confirmation of a correct function are laid down in such a way that an uncertain detection range possibly present is assigned to both criteria. A decision on the presence of a faulty or fault-free state can then be reached according to one of the methods set forth above, for example, by means of appropriate comparison of the number of results indicative of a fault with that of results not indicative of a fault in the specific test routine. Such checking for functional confirmation is helpful, in particular, in the monitoring of actuators, since it is successful only if a fault occurs neither in the case of active nor in the case of a passive actuator.

Since in the case of the present diagnostic method virtually all operating parameters relevant in this regard are present, it is easily possible to determine and retain the dwell time in specific operating regions. Such information can then be used, for example, to establish how the respective vehicle is typically driven and how it therefore should best be maintained.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of operating a diagnostic device in a motor vehicle, the diagnostic device using a multiplicity of single test routines successively pending in a prescribed cyclic sequence, each of the multiplicity of single test routines being activated only in response to interrogatable start conditions specific to the test routine, the method comprising the steps of:

retrievably storing in a memory an item of data information relating to whether a respective test routine has been performed at least once in a current operating phase of the diagnostic device;

prior to activating a test routine which is pending in accordance with the prescribed cyclic sequence, determining whether the pending test routine has already been performed at least once before, and determining whether at least one other test routine exists whose interrogatable start conditions are present and yet has not been performed, said determining steps being performed by retrieving appropriate stored data from the memory;

activating the pending test routine when it is determined that the pending test routine has not already been performed at least once and there is no other test routine existing having start conditions present which has not yet been performed; and activating said at least one other test routine not yet performed when it is determined that the pending test routine has already been performed at least once before.

2. A method according to claim 1, the method further comprising the steps of:

before evaluating a respective test routine, inquiring as to whether values of input variables required for the test routine evaluation lie outside plausible prescribed value ranges; and blocking an evaluation of the test routine, as well as of all other test routines whose input variables are a function of the evaluation of the test routine, when at least one input variable value lies outside its assigned value range.

3. A method according to claim 1, the method further comprising the steps of:

storing within a prescribable period, test results indicative of a fault or not fault for each test routine performed once or several times; and signalling the presence of a fault with respect to an associated test routine when a ratio of a number of test results indicative of a fault to those not indicative of a fault recorded within the prescribed period exceeds a prescribed limiting value.

4. A method according to claim 2, the method further comprising the steps of:

storing within a prescribable period, test results indicative of a fault or not fault for each test routine performed once or several times; and signalling the presence of a fault with respect to an associated test routine when a ratio of a number of test results indicative of a fault to those not indicative of a fault recorded within the prescribed period exceeds a prescribed limiting value.

5. A method according to claim 1, a method further comprising the steps of:

repeatedly retrieving and evaluating the stored data relating to the execution performed at least once in the current operating phase for a respective test routine as to whether each test routine has been performed at least once; and generating and retrievably restoring data relating to readiness for fault readout.

6. A method according to claim 1, further comprising the steps of retrievably storing data relating to an instantaneous value of preselected environmental parameters for a first, as well as for a respectively last, occurrence of a test result of a test routine, said test result indicating a fault.

7. A method according to claim 1, further comprising the steps of:

within each current operating phase, inquiring as to whether each test routine to be performed under normal operating conditions has been performed at least once and a fault has been detected thereby; and activating a warning lamp when a number of operating phases in which the fault has occurred exceeds a prescribed limiting value.

* * * * *